United States Patent [19]

Kunz

[11] 4,440,251
[45] Apr. 3, 1984

[54] SCALE WITH SIMPLIFIED GUIDANCE-DAMPER CONSTRUCTION

[75] Inventor: Peter Kunz, Gossau, Switzerland

[73] Assignee: Mettler Instrumente AG, Greifensee, Switzerland

[21] Appl. No.: 373,174

[22] Filed: Apr. 29, 1982

[30] Foreign Application Priority Data

Aug. 18, 1981 [CH] Switzerland ............... 5326/81

[51] Int. Cl.³ ........................................... G01G 23/08
[52] U.S. Cl. .............................. 177/187; 177/210 C; 177/229
[58] Field of Search ............... 177/229, 210 C, 187, 177/189, 184, 210 EM, 185, 188, 186

[56] References Cited

U.S. PATENT DOCUMENTS

| | | | |
|---|---|---|---|
| 2,771,289 | 11/1956 | Hadley | 177/185 |
| 2,793,026 | 5/1957 | Giardino | 177/210 C |
| 3,288,231 | 11/1966 | Hanne | 177/229 X |
| 3,354,972 | 11/1967 | Hammerschlag | 177/188 |
| 4,184,557 | 1/1980 | Kunz | 177/229 |
| 4,382,479 | 5/1983 | Lee | 177/189 |

*Primary Examiner*—Joseph W. Hartary
*Attorney, Agent, or Firm*—Marianne Rich

[57] ABSTRACT

In a scale wherein the force or load receiver is guided along a vertical path by a parallel guidance system having an upper and a lower plate, the lower plate cooperates with a recess in the lower part of the housing to form an air damper. Specifically, the lower plate of the parallel guidance system constitutes the piston of the air damper. For the scale with a capacitive sensor, the plate constituting the piston of the air damper is a metallic plate which also constitutes the movable plate of the measuring capacitor.

3 Claims, 2 Drawing Figures

SCALE WITH SIMPLIFIED GUIDANCE-DAMPER CONSTRUCTION

The present invention relates to force measuring apparatus such as scales and, more particularly, to force measuring apparatus requiring damping. The range of application of the invention includes, but is not limited to, scales utilizing springs, vibrating strings or strain gauges as measuring elements. For purposes of the present invention it is only important that the force receiving element undergoes a relatively substantial deflection under load and that a damper is provided to shorten the transient response time.

SUMMARY OF THE INVENTION

It is an object of the present invention to decrease the number of component parts constituting a scale of the above-described type, thereby also effecting a simplification of the manufacture and assembly of such a scale.

In accordance with the present invention, the scale hs combined guidance and damping means such as a guidance system of parallel construction having at least one member which also constitutes the piston of a damper. The damper may be either a fluid damper or an air damper.

In a preferred embodiment of the invention, the lower member of the guidance apparatus constitutes the piston of the damper and cooperates with a recess in the lower portion of the scale to constitute the air damper.

The guidance member constituting the piston of the damper is, preferably, a stiff rectangular plate.

Further, the stiff rectangular plate constituting the piston of the damper should have a greater surface area than the second plate of the parallel guidance system, since this increases the damping effect and permits greater control thereof.

In spring scales, the force or load measurement is often carried out by a capacitive sensor. It is a particular advantage of the present invention that the guidance member acting also as the piston of the damper can further be utilized as the moveable plate of the capacitive sensor.

The novel features which are considered as characteristic for the invention are set forth in particular in the appended claims. The invention itself, however, both as to its construction and its method of operation, together with additional objects and advantages thereof will best be understood from the following description of specific embodiments when read in connection with the accompanying drawing.

DESCRIPTION OF THE PREFERRED EMBODIMENT

Figure 1:
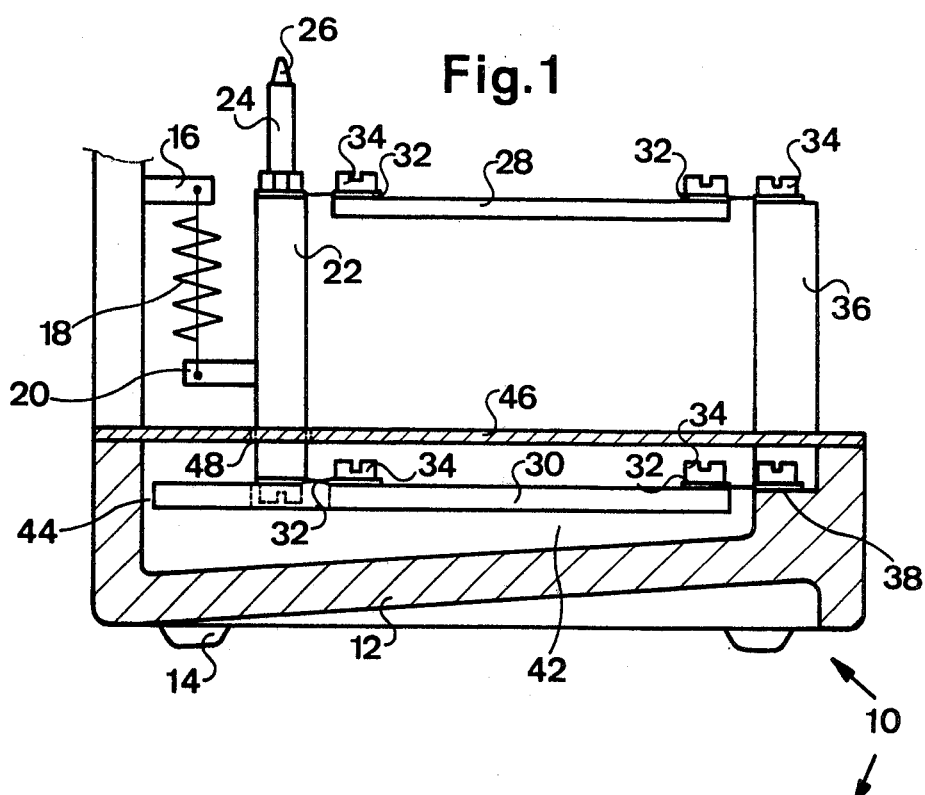
FIG. 1 is a section through line I—I of FIG. 2.

The scale of the present invention has a housing 10 with a lower part 12. Three feet 14 are attached to lower part 12 of the scale. An arm 16 is affixed to the front of the housing (left in the figure). A measuring spring 18 which may be adjustable is connected between arm 16 and a lower arm 20. Arms 16 and 20 are aligned in the vertical plane. Arm 20 is part of the lower part of the force receiving member 22. A bolt 24 with a conical top 26 is connected to the upper part of force receiving member 22. The pan (not shown) of the scale would be mounted on conical portion 26 of bolt 24. Parallel guidance apparatus for force receiving member 22 is constituted by an upper member 28 and a lower member 30. The movable end of upper member 28 is connected by means of a flat spring 32 to force receiving member 22. Flat spring 32 is fastened to member 28 by screws 34. At the fixed end, upper member 28 is connected by two flat springs 32 to respective ones of two columns 36, again by screws 34. Similarly, the stationary end of lower member 30 is connected to the housing by two flat springs 32, each of these springs being screwed into an internally projecting portion 38 of the lower part 12 of the housing. Finally, a similar flat spring connects the movable part of member 30 to the lower part of force receiving member 22.

The lower part 12 of housing 10 has a recessed portion 42. This has a slope extending from the back to the front of the scale, thus accomodating the angle of traverse of member 30. Here, member 30 is a stiff rectangular plate dimensioned so that an air gap 44 is created between the sides of the plate and respective walls of the housing opposite thereto. The actual dimension of the air gap is a compromise between achieving the required damping effect and minimizing the accuracies and tolerances required during manufacture and assembly. In practice, a gap of approximately one to two millimeters has been found to achieve satisfactory results.

Figure 2:
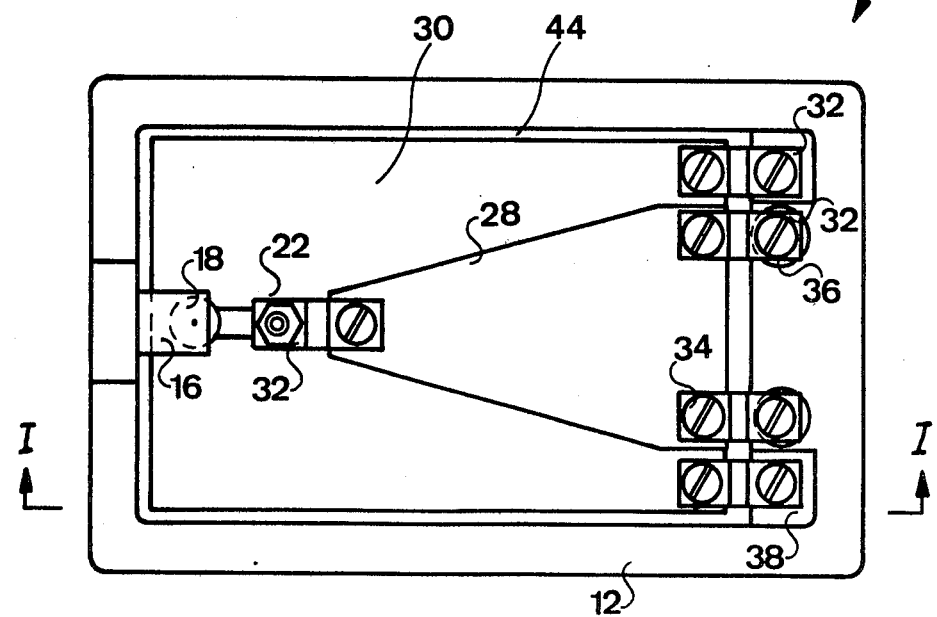
FIG. 2 is a top view of the scale.

A stationary metal plate 46 (not shown in FIG. 2) is mounted slightly above member 30. It, together with metallic member 30 constitutes a capacitor whose changes in capacitance are indicative of the distance between member 30 and plate 46. These changes in capacity can be utilized to generate a force proportional signal. Force receiving member 22 passes through a hole in plate 46.

The damper can be constructed either as a single or as a double acting damper. For a double acting damper, plate 46 will be provided even if no capacitive sensor is utilized. For example, such a plate may be provided even if an inductive, a photoelectric, a vibrating string or a strain gauge sensor is used.

It will be noted that all details and parts of the scale which are not required for the understanding of the present invention have been omitted. For example, neither the pan nor the top of the housing is illustrated. Further, the whole electrical portion of the scale, including the processor for the sensed signal and the display have been omitted.

It will further be understood that, instead of the simple capacitive sensor shown in the drawing a differential capacitive sensor could be used, thereby increasing the linearity of the measuring signal.

The invention can also be used in scales having more than two guide members. A scale having a parallel guidance apparatus with more than two such members is, for example, illustrated in U.S. Pat. No. 4,184,557. This patent is hereby incorporated by reference into this application.

The present invention is not to be limited to the illustrated embodiment, or the alternative embodiments described above. Many variations of this invention will be evident to one skilled in the art and are therefore intended to be encompassed in the invention as set forth in the following claims.

I claim:

1. In force measuring apparatus comprising force receiving means, the improvement comprising combined guidance and damping means connected to said force receiving means, said combined means having one member operative both to guide said force receiving means along a predetermined path upon application of force thereto and to dampen the motion of said force receiving means along said path;

a housing for said force receiving and combined means;

means for mounting said combined means in said housing in such a manner that said one member and a predetermined part of said housing together constitute an air damper;

wherein said combined means comprises guidance means of parallel construction having an upper member and a stiff lower plate constituting said one member, said predetermined part of said housing being the lower part thereof; and wherein said stiff lower plate is mounted within said lower part of said housing in such manner that a predetermined small air gap is created between the edges of said stiff lower plate and the walls of said housing opposite thereto.

2. Apparatus as set forth in claim 1, wherein said upper member is a stiff plate having a predetermined surface area;

and wherein said stiff lower plate has a surface area exceeding the surface area of said upper plate.

3. Apparatus as set forth in claim 1, wherein said force measuring apparatus further comprises capacitive means for sensing the position of said force receiving member along said predetermined path, said capacitive means comprising a capacitor having a moveable plate; and wherein said one member further constitutes said movable plate of said capacitor.

* * * * *